(12) United States Patent
Huang et al.

(10) Patent No.: US 8,203,805 B2
(45) Date of Patent: Jun. 19, 2012

(54) ABS WITH LUBRICANT CONTROL TRENCHES FOR HARD DISK DRIVES

(75) Inventors: Weidong Huang, San Jose, CA (US); Sang Hoon Kim, Berkeley, CA (US); Charles M. Mate, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 624 days.

(21) Appl. No.: 12/398,909

(22) Filed: Mar. 5, 2009

(65) Prior Publication Data

US 2010/0226035 A1 Sep. 9, 2010

(51) Int. Cl.
*G11B 5/60* (2006.01)
(52) U.S. Cl. ............... 360/235.4; 360/75; G9B/5.229; G9B/21.003
(58) Field of Classification Search .............. 360/235.4, 360/75
See application file for complete search history.

(56) References Cited

U.S. PATENT DOCUMENTS

| | | | |
|---|---|---|---|
| 6,055,127 A * | 4/2000 | Boutaghou et al. | 360/236 |
| 6,188,547 B1 | 2/2001 | Gui et al. | |
| 6,594,113 B2 | 7/2003 | Rao et al. | |
| 6,747,847 B2 | 6/2004 | Stoebe et al. | |
| 7,054,108 B2 | 5/2006 | Boutaghou et al. | |
| 7,227,723 B2 | 6/2007 | Nath et al. | |
| 2008/0123220 A1 | 5/2008 | Kajitani | |
| 2009/0310259 A1* | 12/2009 | Hanyu | 360/235.6 |

* cited by examiner

*Primary Examiner* — Jami M Valentine
(74) *Attorney, Agent, or Firm* — Patterson & Sheridan, LLP

(57) ABSTRACT

A method and apparatus for controlling lubrication in hard disk drives. Hard disk drives often include lubrication on the disks to protect the disks from incidental contact with the head slider. Embodiments of the invention include lubrication control recesses on the air bearing surface (ABS) of the head slider. The recesses reduce air stagnation on the ABS and/or store excess lubrication that migrates from the disk to the head slider. By reducing build-up of lubrication and storing excess lubrication, the lubrication control recesses avoid failure that may occur as a result of the lubrication interfering with the ABS or the read/write elements of the head.

17 Claims, 3 Drawing Sheets

ABS WITH LUBRICANT CONTROL TRENCHES FOR HARD DISK DRIVES

BACKGROUND OF THE INVENTION

1. Field of the Invention

Embodiments of the invention generally relate to the field of hard disk drives. More specifically embodiments of the invention relate methods and apparatus to control lubrication migration on head sliders in hard disk drives.

2. Description of the Related Art

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

One basic hard disk drive model was developed approximately 40 years ago and in some ways resembles a phonograph type apparatus. For instance, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the head disk assembly, or HDA.

In operation, the hard disk is rotated at a set speed via a spindle motor assembly having a central drive hub. Additionally, there are channels or tracks spaced at known intervals across the disk. Most current embodiments arrange the signal regions in concentric circular tracks, but other designs, such as spirals or irregular closed or open paths are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk. Refinement of the disk and the head have provided reductions in the size of the hard disk drive. For example, the original hard disk drive had a disk diameter of 24 inches. Modern hard disk drives are much smaller and include disk diameters of less than 2.5 inches.

The ever increasing need for data storage has led some disk drive makers to steadily increase the amount of data stored on a drive. Mechanical considerations, radiated audible noise limits, power requirements, and other factors limit the number of disks that can be economically combined in a single drive. Thus, disk drive technology has generally focused on increasing the amount of data stored on each disk surface by positioning the heads more closely to the media surface. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows: As the media moves relative to the head, air is dragged by the disk surface through specifically designed channels in the surface of the head adjacent to the media surface. The surface of the head and the channels contained therein, collectively referred to as the air-bearing surface (ABS), are designed to generate regions of increased air pressure in between the ABS and media surface that forces the head away from direct contact with the media surface, in effect causing the head to fly above the media surface. The separation of the head ABS and media surface, commonly called fly height, is a complex phenomenon that is primarily a function of air density, the spring preload, the relative speed between the head and media surface, and the pattern of channels present on the head air bearing surface adjacent to the media surface. It is well known to those familiar with head-disk interface design that a particular head-disk combination will not fly precisely at the desired separation. Variances in mechanical tolerances, spring tensions, and other factors result in a nearly normal statistical fly-height population distribution generally centered about the mean fly height. Furthermore, the head and its mounting gimbal are subject to mechanical tolerances, aerodynamic forces, and inertial forces that can cause it to deviate from the desired altitude with respect to the media surface, (e.g. static and dynamic pitch and roll). This can move some areas of the air bearing surface closer or further from the media surface.

SUMMARY OF THE INVENTION

Accordingly, what is needed is an air bearing surface (ABS) design that will continue to function reliably at ultra-low fly heights, even in the presence of lubrication contamination.

In one embodiment the invention is a method of controlling lubrication migration on a head slider of a hard disk drive. The head slider has an air bearing surface (ABS) and a trailing edge. The method includes providing at least one recess on the ABS of the head slider, the at least one recess defined by a floor and one or more side walls that define a surface that completely surrounds the floor, wherein the at least one recess is sized and positioned to perform at least one of reducing air stagnation on the ABS and storing lubrication.

In a further embodiment, the invention is a head slider of a hard disk drive. The head slider includes an air bearing surface (ABS) and at least one recess on the ABS of the head slider. The recess has a floor and one or more side walls that completely surround the floor, wherein the at least one recess is adapted to perform at least one of reducing air stagnation on the ABS and storing lubrication.

In yet a further embodiment, the invention is a hard disk drive that includes a disk and a head slider. The disk includes lubrication thereon, and the head slider includes an air bearing surface (ABS) and at least one recess on the ABS of the head slider. The recess has a floor and one or more side walls that completely surround the floor, wherein the at least one recess is sized and positioned to perform at least one of reducing air stagnation on the ABS and storing lubrication.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
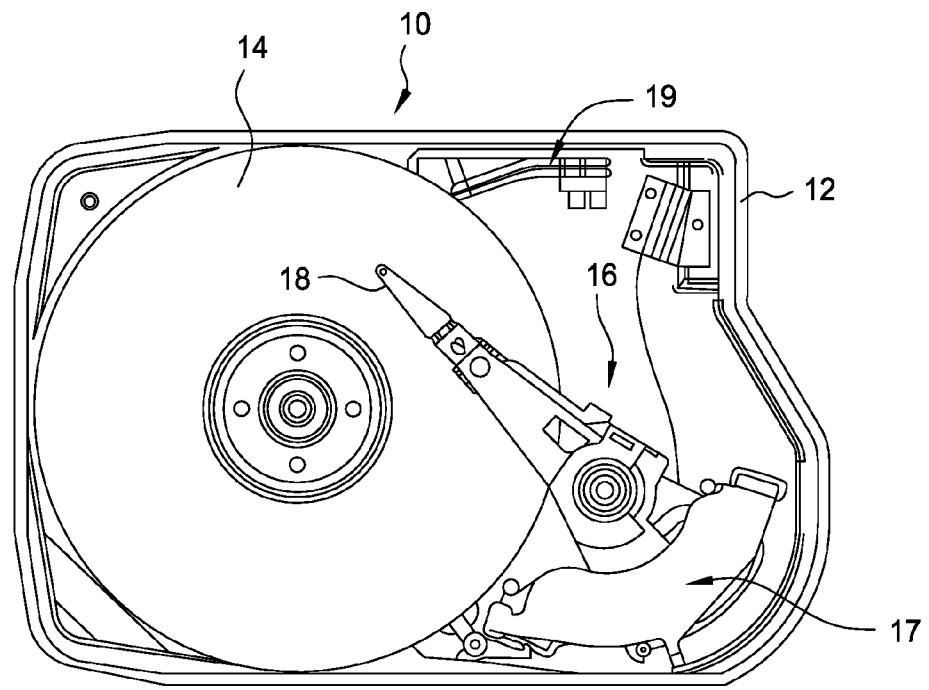
FIG. 1 shows an exemplary disk drive having a magnetic disk, and a head slider mounted on an actuator, according to embodiments of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

As was noted above, fly height may vary for any number of reasons. Reducing the fly-height, while advantageously increasing the signal-to-noise ratio of the recovered signal, can undesirably lead to reduced disk drive reliability. Such reliability reduction can occur in the presence of particulate or lubrication contamination. Particulate contamination can include wear particles from drive components and/or airborne contaminates from the ambient surroundings. Lubrication contamination can occur from the protective lubrication on the disk surface migrating to the head slider surfaces. Such lubrication contaminants can accumulate on the air bearing surface. The buildup of lubrication contaminants can disrupt air flow, thus causing the head to fly higher or lower than desired, or at a different orientation relative to the media surface than desired. The lubrication buildup can also bridge the narrow fly height gap. This can lead to fouling and contact between the head and media. The resulting contact can generate more lubrication migration to the head slider, which can further exacerbate contamination. This can lead to drive failure that can occur rapidly by this mode.

Lubrication that is picked up on the head slider's ABS, will travel toward the trailing edge of the head slider, due to the air shear stress present while the head slider is "flying" over the disk surface. Further, lubrication that is deposited on the trailing edge, may migrate back onto the ABS. Often, the read/write head is on a pad that is near the trailing edge. Thus, lubrication buildup may collect near the read/write head transducer elements. Many components of the transducer elements have significant ferromagnetic properties. Thus, the magnetic sensitivity of a drive read element can be distorted and reduced, which can lead to lowered signal to noise ratios and drive failure. In an optical drive, lubrication can distort and/or occlude the optical path, which can result in poor performance.

Embodiments of the invention provide lubrication control methods and apparatus for head sliders in hard disk drives. One embodiment provides an air bearing surface (ABS) having one or more recesses for reducing air stagnation and/or the accompanying lubrication build-up near the trailing edge of the head slider ABS, and for receiving and trapping excess lubrication on the ABS. Therefore, embodiments of the invention allow the ABS to be effectively positioned in reference to the disk surface without (or with relatively less) lubrication buildup proximate with the trailing edge of the ABS. Fouling, head-disk contact, reduced transducer signal-to-noise ratio, and other detrimental outcomes of lubrication buildup are deterred with one or more recesses according to embodiments of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating.

Figure 2:
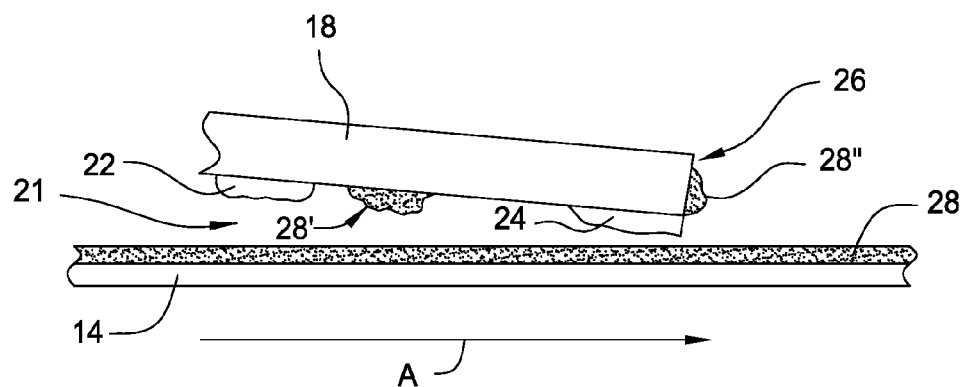
FIG. 2 is a side view of the head slider and magnetic disk of the disk drive of FIG. 1, according to embodiments of the invention.

FIG. 2 is a side view of the head slider 18 and the magnetic disk 14 of FIG. 1. Magnetic disk 14 is moving in the direction of arrow A, and causes airflow in the same direction. This airflow flows over the air bearing surface (ABS) 21 of the head slider 18 and produces the lifting pressure described above. In one embodiment, head slider 18 includes raised areas such as front pad 22 and trailing pad 24. Trailing pad 24, located adjacent to and centered relative to, the trailing edge 26 of the head slider 18, may further include the read/write head that writes and reads data to and from magnetic disk 14. Disk 14 has a lubricant 28 on its upper surface to protect the disk 14 from contact with the head slider 18 and/or other components of the disk drive. In operation, lubricant 28 may migrate onto head slider 18. Lubricant on forward portions of the head slider 18, such as that labeled 28', will migrate toward the trailing edge 26 of the head slider 18 as it is acted upon by the air flowing over the ABS of the head slider 18. The lubricant will eventually collect on the trailing edge 26 of the head slider 18 as shown by lubricant 28". The lubricant 28" on the trailing edge of head slider 18 may flow onto trailing pad 24 and interfere with the read and write elements or other functional portions of the read/write head.

Figure 3:
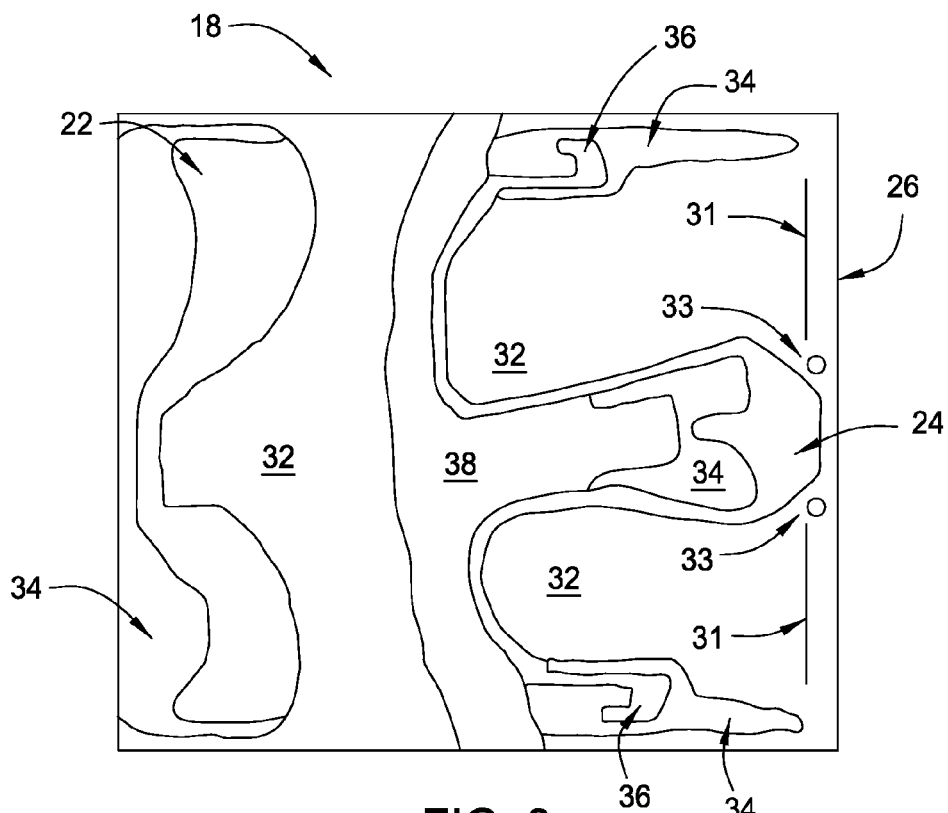
FIG. 3 is a plan view of the bottom of head slider of FIGS. 1 and 2, showing the air bearing surface (ABS) of the head slider, according to embodiments of the invention.
Figure 4:
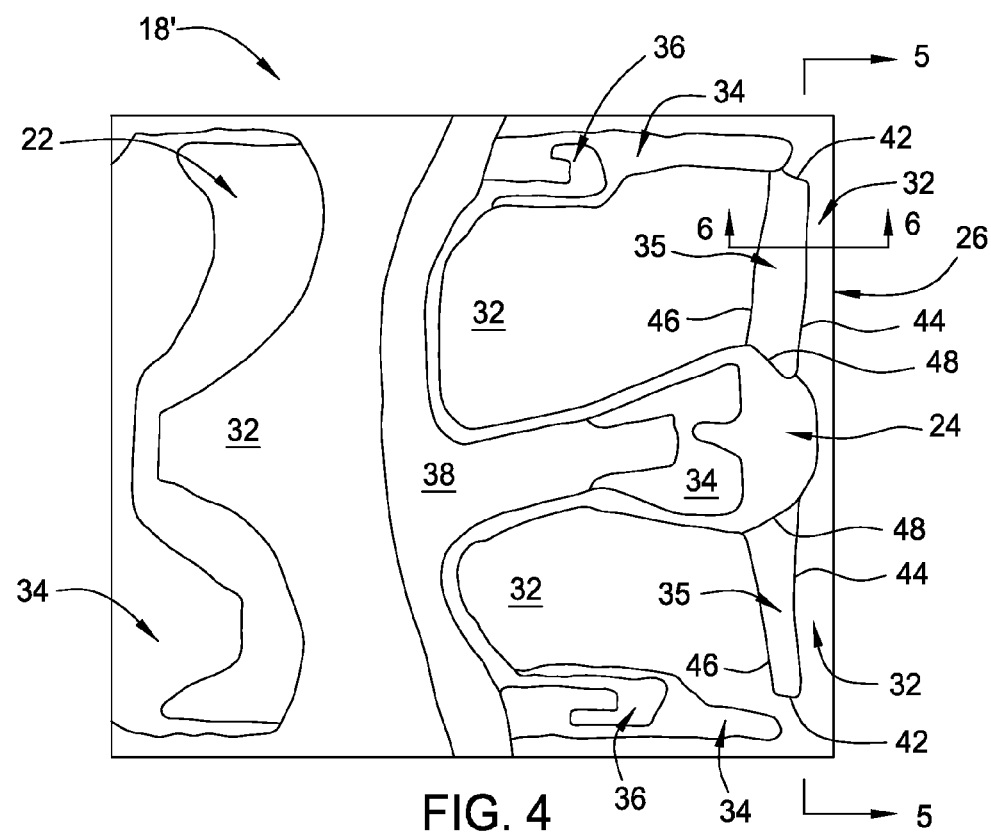
FIG. 4 is a plan view of the bottom of head slider of FIGS. 1 and 2, showing the air bearing surface (ABS) of the head slider, including lubrication control recess in the form of trenches, according to embodiments of the invention.

FIG. 3 shows one embodiment of the bottom of head slider 18 of FIGS. 1 and 2, from the air bearing surface (ABS) of the head slider. The ABS includes first surfaces 32 at a first height (distance from disk 14 as seen in FIG. 2), second, upper raised surfaces at a second height closer to the disk 14 and above the first height (such as front pad 22 and trailing pad 24) and third, intermediate raised surfaces 34 at a third height in between the first and second height. Other second, upper raised surfaces may be included such as side pads 36. The ABS of head slider 18 may also include fourth, recessed surfaces, such as surface 38, that are further from disk 14 than surfaces 32. It should be understood that the arrangement of surfaces as shown in FIGS. 3 and 4, is only one particular arrangement of raised and recessed surfaces that may be present on the ABS of a head slider, and should not be considered limiting in terms of the invention, and is only provided here as an example. As air flows over the ABS surface, there are certain areas where the air flow is stagnant, forming stagnation lines 31 and stagnation points 33. These stagnation areas act as gathering points for lubrication that is picked-up from the disk 14. If too much lubricant is collected in these areas, the lubricant may affect the read and write elements or other functional portions of the read/write head (not shown) that, in one embodiment of the invention is mounted on trailing pad 24.

FIG. 4 shows another embodiment of the bottom of head slider 18' of FIGS. 1 and 2, from the air bearing surface (ABS) of the head slider. As described with reference to the head slider embodiment of FIG. 3, the ABS in FIG. 4 includes first surfaces 32 at a first height (distance from disk 14 as seen in FIG. 2), second, upper raised surfaces at a second height closer to the disk 14 and above the first height (such as front pad 22 and trailing pad 24) and third, intermediate raised surfaces 34 at a third height in between the first and second height. Other second, upper raised surfaces may be included such as side pads 36. The ABS of head slider 18' may also include fourth, recessed surfaces, such as surface 38, that are further from disk 14 than surfaces 32. As shown in FIG. 4, head slider 18' includes one embodiment of lubrication control recesses, in the form of trenches 35, below the first level in those areas where the air flow may be stagnant. Lubrication that is picked-up from the disk 14, may collect on trailing edge 26, and as previously described, may migrate back onto surface 32 and onto pad 24 such that the lubricant may affect the read and write elements or other functional portions of the read/write head. The provision of the lubrication control trenches 35 may mitigate this detrimental result in that the trenches 35 prevent the lubrication from flowing back and forth through the region.

In one embodiment of the present invention, lubrication control trenches 35 are "blind" trenches. A blind trench, for purposes of this application, embodies a trench with a floor and one or more side walls that form an annular surface that completely surrounds the floor of the trench. In this way, the trench is enclosed by the side wall surface that has a minimum height such that any access into the trench is from a higher level (i.e., higher than the minimum height), as opposed to trenches (or recesses) that are open and have an open side wall area where access to the trench is available from an area below the higher level surrounding the trench. For example, trenches 35 are both surrounded by the higher level surfaces 32 on sides 42, 44 and 46 and by even higher level surface pad 24, on side 48. An open trench, for example, might extend to the edge of head slider 18', thereby providing access to the trench from a level that is lower than surfaces 32. Trenches 35 weaken stagnation lines 31 and points 33 reducing the amount of lubrication deposited on the ABS of head slider 18'. Further, when the head slider 18' is parked (for example, on ramp 19 in FIG. 1), excess lubrication on the trailing edge 26 that flows toward the ABS, may be trapped and stored in the trenches 35. Due to the blind nature of trenches 35, lubrication that enters the trenches 35, will tend to stay in the trenches 35. While the trenches 35 are shown as two trenches that extend, approximately parallel to the trailing edge 26 of the head slider 18, and from each side of pad 24, it should be noted that a single trench, or a larger number of trenches may be used depending on the configuration of surfaces present on the head slider 18'. Also, while it is most advantageous to place the trenches at stagnation points or lines on the ABS surface, other locations may be equally advantageous, and the location of the trench or trenches, should not be considered limited by the examples provided herein.

Figure 5:
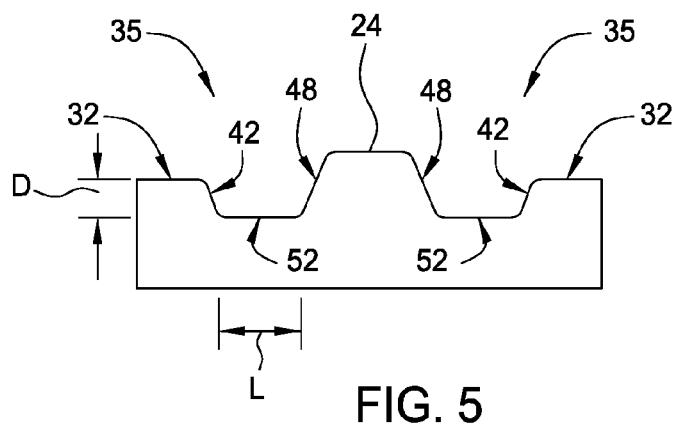
FIG. 5 is a cross section of the head slider of FIG. 4 taken through line 5-5.
Figure 6:
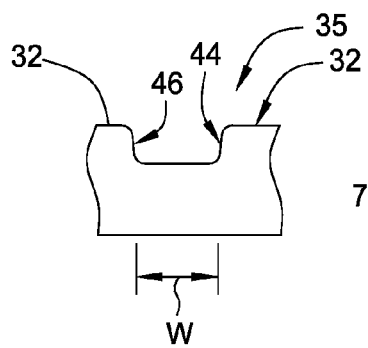
FIG. 6 is a partial cross section of the head slider of FIG. 4 taken through line 6-6.

FIG. 5 shows a cross section through line 5-5 of FIG. 4. Trenches 35 extend for length L between side walls 42 and 48. The floor 52 of the trenches is at a depth D below surface 32. To effectively trap and hold a significant amount of lubrication, in one embodiment, the depth D, of the trenches 35 is between 0.1 µm and 10 µm deep and the length L of the trenches is between 10 µm and 800 µm. Of course, the dimensions need not be uniform, so that, for example, the depth D of the trench may vary with the length L. FIG. 6 is a partial cross section through line 6-6 of FIG. 4. Trenches 35 extend for width W between side walls 46 and 44. In one embodiment, the width W of trenches 35 is between 10 µm and 400 µm. As with the depth D, the width W of the trenches 35 need not be uniform and may vary along the length L and vise versa.

Trenches 35 can be formed by ion milling or reactive ion etching (RIE).

Figure 7:
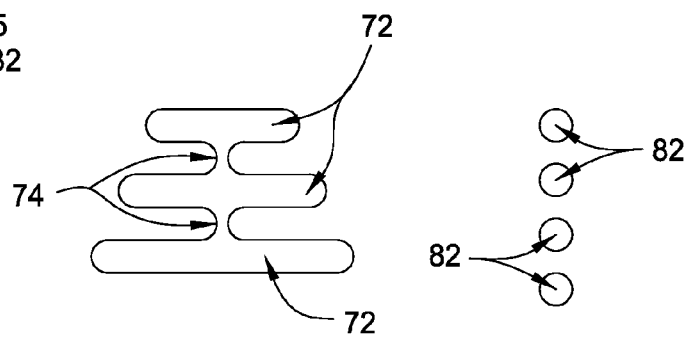
FIGS. 7-11 are plan views of further arrangements of lubrication control recesses, according to embodiments of the invention.

The foregoing embodiments describe one or more trenches for reducing air stagnation and/or the accompanying lubrication build-up near the trailing edge of the head slider ABS, and for receiving and trapping excess lubrication on the ABS. However, more generally, any recess(es) may be provided for this purpose. The recesses may be varied in shape, number, location and dimensions. For example, while FIG. 4 shows a single trench 35 on either side of trailing pad 24, FIG. 7 shows a plan view of the ABS showing an arrangement of a plurality of trenches 72, according to another embodiment of the invention. The arrangement of trenches 72 may be formed on each side of the trailing pad 24, or alternatively may be located on other portions of the ABS. Specifically, FIG. 7 shows three substantially parallel trenches 72. The dimensions of the parallel trenches may be uniform or varied relative to one another. Further, a transverse trench 74 intersects each set of three trenches 72, thereby fluidly coupling the trenches in each set. It should be noted, however, that the illustrative sets of trenches are still "blind", i.e., fully enclosed by a side wall so that each set of trenches defines a respective reservoir for collecting lubricant.

Figure 8:
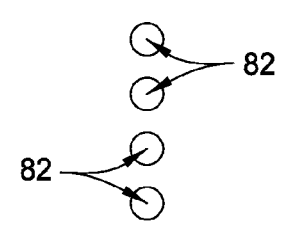

Further, while FIGS. 4-7 show trenches that are substantially polygonal, FIG. 8 shows recesses formed as an arrangement of a plurality of ellipses 82 (circles in this illustration). Illustratively, a set of four ellipses may be formed on either side of the trailing pad 24 or elsewhere on the ABS. The ellipses in each set are generally arranged in a row. However, the number and relative arrangement of ellipses may be varied according to different embodiments. As with trenches 72, ellipses 82 may be connected by a trench to fluidly couple the ellipses 82 to one another.

Figure 9:
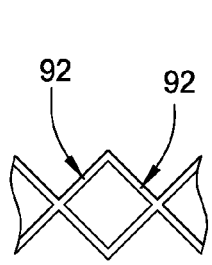
Figure 10:
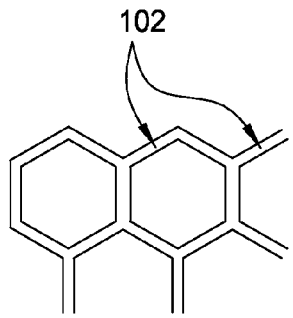
Figure 11:
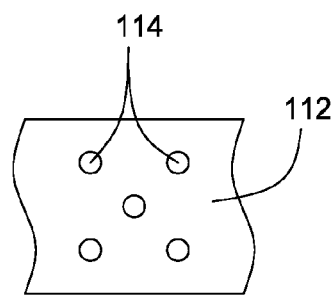

One of the mechanisms for holding lubricant in the trenches is the capillary action from the meniscus that forms along the intersection of a trench side and the trench floor. Therefore, it is desirable to maximize the length of side-floor intersection within a particular area of trench so as to increase the volume of lubricant that can be held with this area. Many other geometries of trenches, besides those shown in FIGS. 4, 7, and 8, can be utilized for achieving a high ratio of side-floor intersection length per unit area. Examples include but are not limited to: crisscross groves, honeycombed structure, and an array of pillars. FIG. 9 illustrates one embodiment of trenches 92 arranged in a crisscross pattern, while FIG. 10 shows another embodiment where trenches 102 are arranged in a honeycomb pattern. Both of these embodiments increase the side-floor intersection per unit area. In FIG. 11, trench 112 includes a plurality of pillar structures 114 formed in the trench 112. Pillars 114 provide circular side-floor intersections about their periphery to form additional meniscus that acts as storage for lubricant.

In addition to locating these trench patterns at stagnation points 33 and stagnation lines 31 on the slider surface, narrow connecting channels like 74 in FIG. 7 can be used to wick lubricant away from trenches within stagnation zones to trenches on other areas of the slider. Other shapes and arrangements of lubrication control recesses may be provided within the scope of embodiments of the invention, and the above illustrated embodiments should be considered exemplary and not limiting.

While the foregoing is directed to embodiments of the present invention, other and further embodiments of the invention may be devised without departing from the basic scope thereof, and the scope thereof is determined by the claims that follow.

What is claimed is:

1. A method of controlling lubrication migration on a head slider of a hard disk drive the head slider having an air bearing surface (ABS) and a trailing edge, the method comprising:
   providing at least one recess on the ABS of the head slider, the at least one recess defined by a floor and one or more side walls that define a surface that completely surrounds the floor, wherein the at least one recess is sized and positioned to perform at least one of reducing air stagnation on the ABS and storing lubrication,
   wherein the ABS comprises a first surface at a first height and a second surface at a second height higher than the first height, and wherein the one or more sidewalls of the at least one recess extend from the first height to the floor, and
   wherein the second surface comprises a trailing pad, wherein the trailing pad has two sides and is adjacent to the trailing edge, and wherein the at least one recess comprises at least two trenches, at least one trench extending from each side of the trailing pad.

2. The method of claim 1 wherein the at least two trenches extend approximately parallel to the trailing edge of the head slider.

3. The method of claim 1 wherein the at least two trenches are between about 0.1 µm and 10 µm deep.

4. The method of claim 1 wherein the at least two trenches are between 10 µm and 400 µm wide.

5. The method of claim 1 wherein the at least one of the at least two trenches extends approximately parallel to the trailing edge of the head slider.

6. The method of claim 1 wherein the ABS includes stagnation areas and providing the at least one recess on the ABS of the head slider comprises providing the at least one recess in at least one of the stagnation areas of the ABS.

7. A head slider of a hard disk drive, the head slider comprising:
   an air bearing surface (ABS); and
   at least one recess on the ABS of the head slider, the recess having a floor and one or more side walls that completely surround the floor, wherein the at least one recess is adapted to perform at least one of reducing air stagnation on the ABS and storing lubrication,
   wherein the ABS comprises a first surface at a first height and a second surface at a second height higher than the first height and wherein the one or more sidewalls of the at least one recess extend from the first height to the floor; and
   a trailing edge, wherein the second surface comprises a trailing pad, wherein the trailing pad has two sides and is adjacent to the trailing edge, and wherein the at least one recess comprises at least two trenches, at least one trench extending from each side of the trailing pad.

8. The head slider of claim 7 wherein the at least two trenches extend approximately parallel to the trailing edge of the head slider.

9. The head slider of claim 7 wherein the at least two trenches are between about 0.1 µm and 10 µm deep.

10. The head slider of claim 7 wherein the at least two trenches are between 10 µm and 400 µm wide.

11. The head slider of claim 7 wherein at least one of the two trenches extends approximately parallel to the trailing edge of the head slider.

12. The head slider of claim 7 wherein the at least one recess includes a plurality of pillars therein.

13. A hard disk drive, comprising:
   a disk, the disk including lubrication thereon; and
   a head slider, the head slider comprising:
   an air bearing surface (ABS); and
   at least one recess on the ABS of the head slider, the recess having a floor and one or more side walls that completely surround the floor, wherein the at least one recess is sized and positioned to perform at least one of reducing air stagnation on the ABS and storing lubrication, wherein the at least one recess includes a plurality of pillars therein.

14. The hard disk drive of claim 13 wherein the at least on recess extends approximately parallel to a trailing edge of the head slider.

15. The hard disk drive of claim 13 wherein the at least one recess is between about 0.1 µm and 10 µm deep.

16. The hard disk drive of claim 13 wherein the at least one recess is between 10 µm and 400 µm wide.

17. A head slider of a hard disk drive, the head slider comprising:
   an air bearing surface (ABS); and
   at least one recess on the ABS of the head slider, the recess having a floor and one or more side walls that completely surround the floor, wherein the at least one recess is adapted to perform at least one of reducing air stagnation on the ABS and storing lubrication, wherein the at least one recess includes a plurality of pillars therein.

* * * * *